Aug. 9, 1932.    T. C. FORBES    1,870,562
BREAD TOASTER
Filed May 23, 1927    4 Sheets-Sheet 1

Inventor
THOMAS C. FORBES
By Paul, Paul & Moore
ATTORNEYS

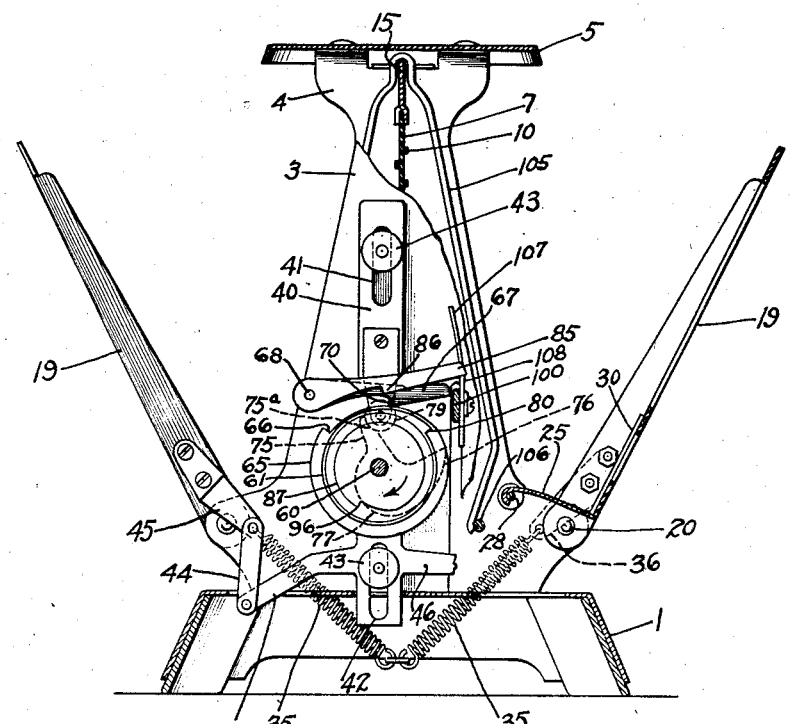
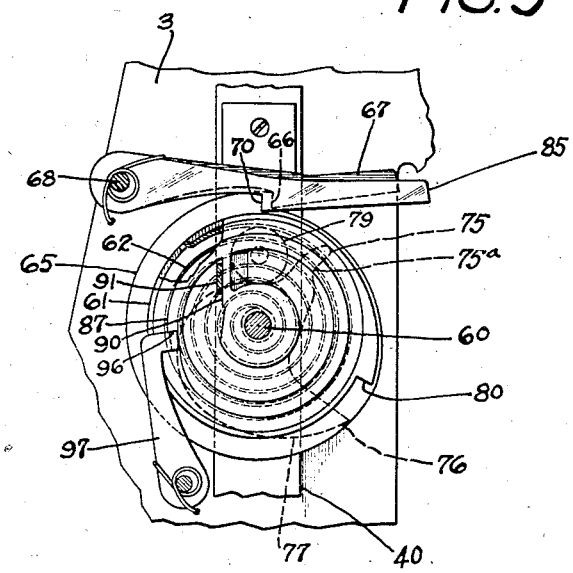

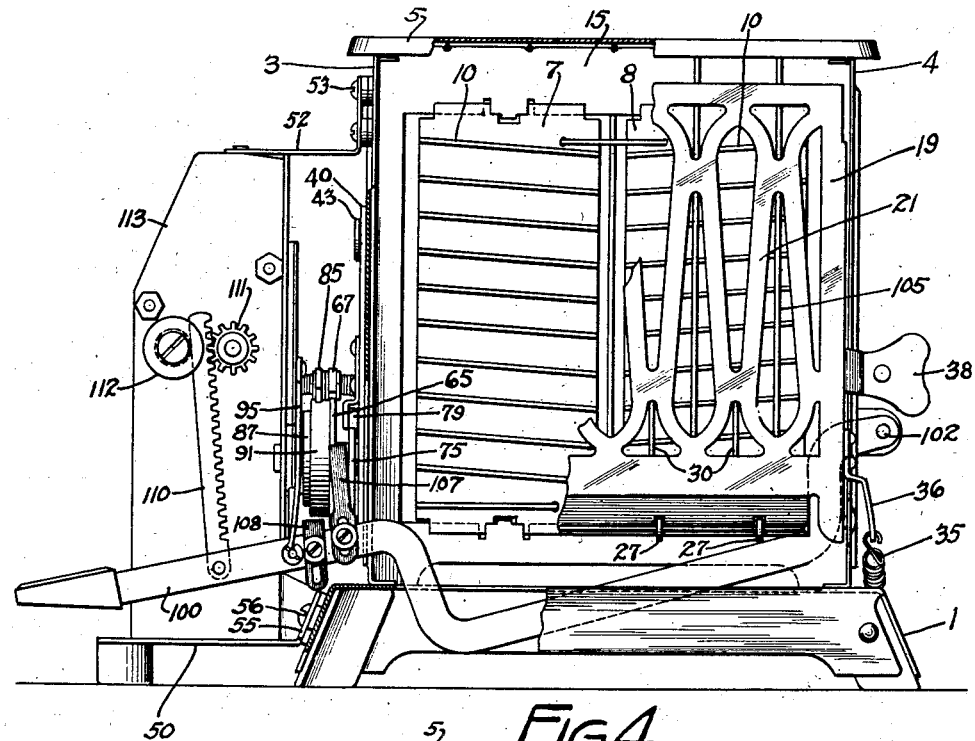

Aug. 9, 1932.   T. C. FORBES   1,870,562
BREAD TOASTER
Filed May 23, 1927   4 Sheets-Sheet 4

Inventor
THOMAS C. FORBES
By Paul, Paul & Moore
ATTORNEYS

Patented Aug. 9, 1932

1,870,562

UNITED STATES PATENT OFFICE

THOMAS C. FORBES, OF HOPKINS, MINNESOTA, ASSIGNOR TO MAX McGRAW, OF CHICAGO, ILLINOIS

BREAD TOASTER

Application filed May 23, 1927. Serial No. 193,558.

This invention relates to improvements in bread toasting apparatus and has for its broad object to provide a bread holding means which, when moved in a certain manner, will act to turn the bread, and to provide a timing mechanism, and connections between the timing mechanism and the bread supporting and turning member for causing the member respectively to hold the bread in toasting position for a timed interval; to operate the bread supporting member to turn the bread and again hold the same in toasting position for a timed interval and finally to withdraw the completely toasted bread from the toasting position or heating zone. Other objects of the invention are to provide specific means for accomplishing the above results.

Features of the invention include the broad idea of applying a timing means to a toast turning device for holding the toast in toasting position; operating the device to turn the toast after a predetermined interval, holding the bread for a predetermined time after toasting; finally withdrawing the bread; as well as the use of a clock mechanism and a bread turning mechanism in combination with a power-operable detent-controlled device, by which the above mentioned movements are controlled; and all details of construction, including combinations and sub-combinations of the elements.

Advantages, objects and features of the invention will be pointed out in the description of the drawings forming a part of this application and in said drawings:

Figure 3 is a view similar to Figures 1 and 2 showing the position of the mechanism at the end of the toasting cycle;

Figure 4 is a side elevation, broken away, with the mechanism positioned in correspondence to that shown in Figures 1 and 7, that is with the timing lever depressed as at the commencement of the toasting cycle;

Figure 5 is a fragmentary elevation showing the timing lever in its uppermost position;

Figure 6 is a detail section on line 6—6 of Figure 5 illustrating the connection between the timing lever and the winding rack;

Figure 7 is an enlarged view showing the angular relations of the parts and corresponding to the position of the parts shown in Figure 1;

Figure 1:
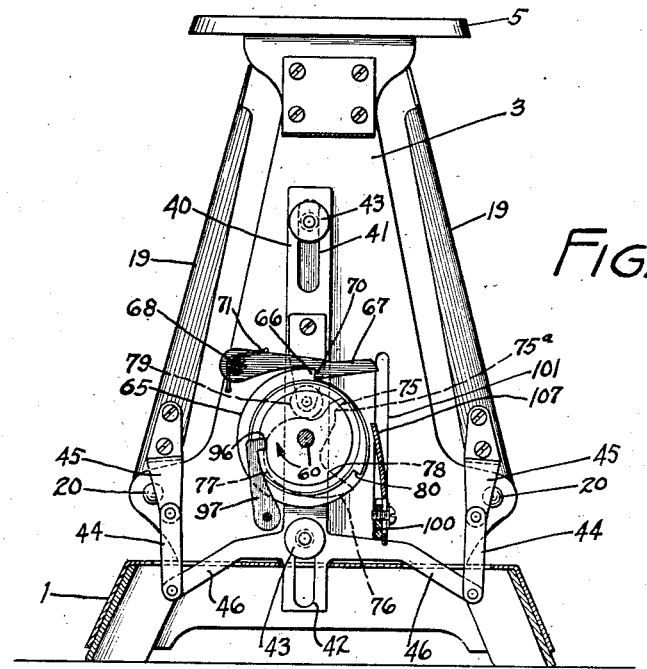
Figure 1 is an end view showing the position of the mechanism at the beginning of a toasting cycle, the clock mechanism having been removed.

The device has a suitable base 1 upon which are mounted two upright elements 3—4 connected by a top piece 5. Removably arranged in this instance centrally of the uprights transversely thereof are heating elements 7—8 comprising in this instance isin-glass bases about which are wound heating coils 10. These heating elements assume an upright position and are supported by a frame 15 in turn removably secured to the end forming uprights 3—4. Suitable electrical connections are provided for the coils.

In this instance, I provide pivoted means movable in one direction to hold the bread in toasting position with reference to the heating elements or toasting chamber or zone, and movable in an opposite direction to withdraw and turn the bread. The preferred forms of turning device has been shown, although it will be understood that other forms of turning mechanism may be employed. The main object of my invention is to provide broadly, means movable to hold the bread in toasting position and also movable to turn the bread, along with the timing mechanism, with connections between the timing mechanism and bread supporting and turning means to cause the means respectively; to hold the bread in toasting position for a timed interval; cause the bread supporting means to turn the bread; again hold the bread in toasting position for a timed interval; and finally withdraw the completely toasted bread from toasting position or from the heating zone. It is believed that this feature in relation to a bread turning device is broadly new.

There are two bread holding and turning elements 19 and in this instance each has the form of a frame and is pivoted as at 20 to lateral extensions of the end-forming supporting elements 3, 4. Each element is of frame-like construction and is cut away to provide ornamental effects generally indicated at 21, see Figure 4. The frame has at its lower portion, see Figure 3, an inwardly directed extension 25 which lies above the pivotal point 20.

At the inner edge of this member arranged for rotation on an axis lengthwise of the element 25 are a series of disk-like rollers 27, having a common support 28 upon which they rotate. The edge of the extension 25 is rolled to secure the element 28. On the inner face of the element 19 and extending outwardly from the extension 25 in a direction perpendicularly to the pivotal axis 20, and to the rotative axis of the rollers 27, are a series of slides 30 having the form of wires, the idea being to reduce friction where the edge of the bread engages the inner face of the element 19 during a turning operation.

It will be understood that when the toasting element 19 is swung outwardly, the lower edge of the bread will slide outwardly upon the elements 30, as the result of the engagement of the outer roller carrying portion of the extension 25 with the inner face of the bread. The rollers operate to reduce friction on the inner face of the bread, to facilitate outward sliding to complete the turning operation. It will be seen that after motion of the bottom of the bread is initiated, the rear surface of the toast is supported by the rollers 27, the slides 30 and rollers 27 thus cooperating to cause the bread to ride or slide outwardly. Coil springs 35 connect arms 36 of the elements 19 with the base and act to urge the elements toward and hold them in toasting position. The elements 19 are, therefore, swung outwardly against the tension of these springs.

Suitable finger grips 38 are provided for operating the toast supporting and turning members independently of the timing mechanism.

The means for operating the bread holding and turning elements comprises in part, a slide 40 slotted as at 41, 42 and arranged for vertical reciprocation on the outer side of the toasting chamber end-forming element 3. The element 40 is thus slidably secured by guide rollers 43, traversing the slots 41, 42 said rollers having flanges lying at the outer side. This slide is provided in this instance with two oppositely extending arms 46, each connected by links 44 with arms 45 detachably secured at the ends of the elements 19. The arrangement is such that when the slide is raised the toast supporting and turning elements are swung outwardly away from the heating element or toasting zone. Moreover, the arrangement is such that they are simultaneously swung.

In order to raise the element 40 at the end of the timed intervals to swing the toast supporting members outwardly, the following mechanism may be viewed as constituting a part of the timing mechanism or may be viewed as power means for moving the bread holding means. The slide 40 and links 44 may be broadly considered as connections between the timing mechanism and the movable bread holding and turning means.

Figure 8:
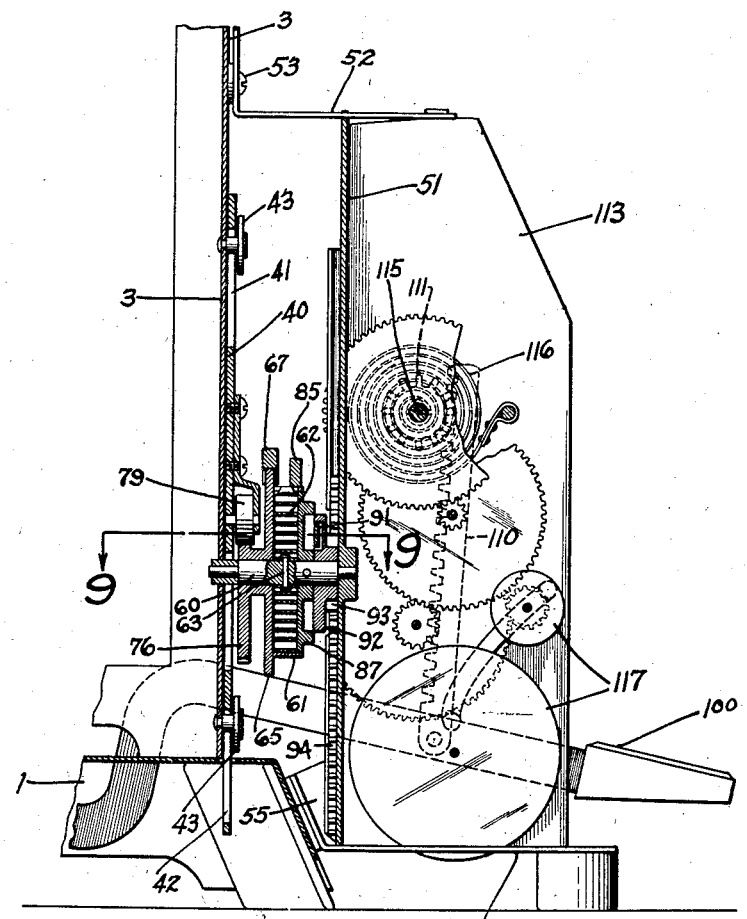
Figure 8 is a vertical section through the spring barrel and associated parts, as well as through the toasting element operating slide. This view also shows the clock mechanism.
Figure 11:
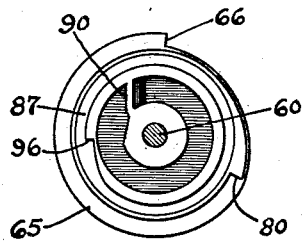
Figure 11 is a face view showing another portion of the winding mechanism, and showing the angular relation of the detent shoulders of the drum and closure plate therefor.
Figure 10:
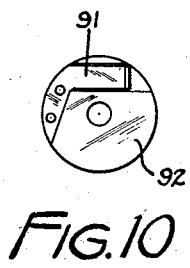
Figure 10 is a face view of the rack operated element as a part of the winding mechanism of the spring drum.

Attached to the base 1 is a shelf-like element 50, as a base for a clock mechanism. An upright member 51 is spaced outwardly from the slide 40 and held at its upper end by a resilient extension 52 secured to the outer face of the element 3 as at 53. This extension also secures the upper portion of the frame of the clock mechanism. The upright support 51 is secured at its lower end to the base 1 by extension 55 and screws 56. Rotatably stepped in the elements 3 and 51, see Figure 8, is a shaft 60 upon which is mounted a spring barrel 61 having a spring 62 therein one end of the spring being suitably secured to the barrel and the opposite end being suitably secured to the shaft 60 as at 63. In this instance, the spring is arranged to cause rotation of the barrel in clockwise direction as viewed in Figures 1, 2 and 3, and 7. The spring barrel is formed with a flange 65 provided with a shoulder 66, or a shoulder may be provided in other ways. Engageable with this shoulder is a detent 67 pivoted upon a support 68 also supported by the elements 3 and 51. This detent or pawl has a shoulder 70 engaged with the shoulder 66 and a suitable spring 71 urges the detent against the flange 65 or toward the shoulder. Rotatable with the spring barrel, and herein shown as integral therewith, is a cam having arms 75 and 76, one of which acts as a stop under certain conditions to be hereinafter described. This cam is also provided with an eccentric peripheral portion 77 which has generally the form of a spiral, its highest portion being at the tip of the projection or arm 76, and its lowest portion being at a point adjacent the base of the extension or arm 75. A substantially radial portion 78 permits the slide 40 to fall abruptly after the portion 77 has raised the slide. The arm 75 acts as a stop, see Figure 3, to hold the bread supporting elements partly open and has a depression 75ᵃ which engages the roller as shown. The slide 40 carries a roller 79 which engages the periphery of the cam, the springs 35 acting through the linkage with the toast supporting elements to yieldably hold the roller against the cam urging it, in this instance, in a downward direction and making it necessary for the cam to raise the slide against the action of the springs 35 when it is desired to throw the toasting element outwardly either for turning the toast or for opening the device so that the toast may be removed at the end of the toasting cycle. The drum is provided with an additional shoulder 80 lying outwardly in an axial direction from the shoulder 66 but not axially aligned therewith. This shoulder is engageable by a shoulder 86 of detent 85, sometimes termed the outer detent. This detent is also swingingly supported upon the element 68, and is also provided with a suitable spring which urges it toward the drum. When the inner detent is raised to release the drum, a turning of the toast results, and when the outer pawl is raised the toasting element is withdrawn from the heating zone. For operating the bread supports to turn the bread, cam surface 77 raises the slide 40 to open the element 19, and then as the tip of the arm 76 passes from beneath the roller, the slide 40 drops to close the elements 19.

The drum 61 is closed on one side by disk 87 keyed to the shaft 60 and is provided with a radial stop 90, as an element of the ratchet mechanism of which the pawl 91 is carried by a disk 92 having formed integral therewith a pinion 93. This disk 92 is rotatable upon the shaft 60 and has engaged therewith a rack 94 connected by a link 95 with the clock winding and timing lever 100. When the rack is lowered, the drum spring is wound and as the rack is raised by action of the timing mechanism, the disk 92 idles. The disk 87 is notched peripherally as at 96 and a spring pressed detent 97 holds it to prevent unwinding movement of the spring plate 92. The lever 100 extends loosely through a slot 101 in the end frame 3, and loosely traverses the end plate 4 to the outer side of which it is pivoted as at 102. The lever thus lies in a plane substantially parallel with that of the heating elements, and that portion which lies between the end plates is disposed adjacent the heating elements and between said elements and a grating 105 formed by a series of vertical bars spaced crosswise between said end frames or elements 3 and 4. This grating prevents the toast from coming in direct contact with the heating elements. The grid bars 105 are substantially V-shaped and rest at their apeces upon the frame 15 which supports the heating elements, the lower ends being attached to cross rods 106.

The tripping and winding lever is provided with two adjustably mounted detent engaging or operating elements, see Figures 1, 2, 3, 4, 5. The element 107 is arranged to engage the inner pawl 67, the engagement with this pawl being the first to take place in the regular cycle of the machine. The release of this pawl results in turning of the toast. The element 108 is for the purpose of engaging and tripping or raising the outer pawl 85 which is the last tripping operation performed. The release of this pawl results in withdrawing the toast from toasting position. Thus, element 107 trips to obtain a turning of the toast, while the element 108 trips to withdraw the toast from the heating zone at the end of the toasting cycle.

Pivoted to the outer portion of the lever 100 is a rack 110 and this rack is guidingly held in meshing relation with a gear 111 by means of a peripherally slotted guide wheel 112. These two elements lie at the outer side of the frame of a clock mechanism generally indicated at 113 see Figure 8. The gear 111 is keyed to the winding shaft 115 of the clock mechanism, the spring of the clock being indicated at 116. A suitable gear train is provided and includes escapement and balance mechanism generally indicated at 117. Inasmuch as the clock mechanism per se may be of any preferred design, it has been considered unnecessary to refer to the parts in detail. It will, however, be understood that in this instance the spring will be wound as the lever 100 is depressed. The timing interval between the turning of the toast and the final removal of the toast from the heating zone can be varied by means of the adjustment of the pawl tripping elements 107—108.

Figure 9:
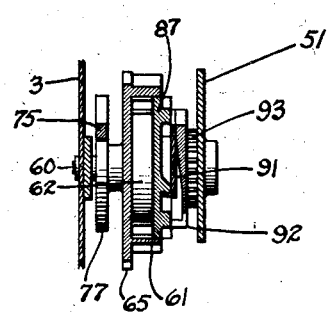
Figure 9 is a plan section on line 9—9 of Figure 8 showing the ratchet mechanism for winding the spring of the spring drum.

The lever 100 is raised by the timing mechanism sufficiently to permit the pawl 91 to engage back of the lug or projection 90 as shown in Figure 9 to obtain a winding action, when the lever is depressed. In the present design, the drum makes substantially only one complete revolution for each operating cycle. It will be further noticed that during upward movement of the lever 100, the element 92, as rotated by the rack 94 through its gear 93, is given substantially one complete rotation to bring the pawl 91 in latching relation with its stop or tooth 90 carried by the drum closure element, 87. The downward movement of the lever results in the winding of both drum and clock springs.

The mechanism including the spring drum and associated parts may be considered as part of the timing mechanism, or it may be considered as a tripping device connecting the movable bread holding and turning elements with the timing mechanism, or as means for moving the bread holding and turning elements. In whatever way it is considered, it is to be understood that this mechanism is for obtaining the proper movements of the bread holding and turning element at the end of predetermined intervals, is considered broadly new. In one sense, the drum and the associated parts constitute driving means, for moving the bread holding and turning elements to toasting position, causing said elements to execute a bread turning movement, and causing said elements to withdraw the bread from the heating zone.

The rotative movement of the drum may be considered as taking place in three steps, and the movement may further be considered a step-by-step movement. In the position shown in Figure 1, the drum is held against rotation by the detent 67. In Figure 2 the drum is held against rotation by pawl 85, and in Figure 3 the drum is held against rotation by arm 75, the roller resting in the depression 75ª in such a manner that the spring tension of the elements 35 is not great enough to depress the slide 40 and rotate the drum in counter-clockwise direction and allow the slide to reach its lowermost position. The result is that the elements 19 are held partly open because the slide has only partly completed its downward movement, and may not complete it because of the nature of the engagement between the roller 79 and the arm 75.

Operation

Assume the toast supporting and turning elements in a position to permit removal of the toasted bread, see Figure 3, in which the toast supporting and turning elements 19 are standing partially open. In this instance, the clock-winding and tripping lever will be in its uppermost position because it is assumed that a toasting cycle has just been completed and, therefore, the timing mechanism is unset or inactive. Under these conditions, neither of the elements 67—85 is functioning, as a latch, but the inner detent 67 is pressing upon the periphery of the flange 65 of the spring-barrel, and the other detent 85 is held in raised position by the adjustable trip or stop 108 of the timing, tripping and winding element 100. Also, under these conditions, the depression 75ª of arm 75 of the slide-operating cam is engaging the roller 75 as a stop, to limit further downward movement of the slide 40, and therefore, to prevent further outward travel of the toast supporting element in a direction away from the toasting zone.

The toast having been removed, the elements 19 are manually depressed and then released. During depression, or after depression, or even before depression, an untoasted piece of bread may be placed within each. The depression of these elements from the position shown in Figure 3 results in raising the slide 40, and roller 79, and release of the arm 75 permitting the spring barrel to rotate in clockwise direction and assume the position shown in Figure 1, in which position shoulder 70 of the detent 67 secures the drum against further rotation. It will be noted that the arm 75 is now positioned at the opposite side of the roller, and that the slide is at its lowermost position, so that tripping of the detent 67 at the end of the first toasting interval will permit further clockwise rotation and allow cam portion 77 to fully raise the slide 40, swing the elements 19 to their extreme throw limits and obtain turning of the toast.

Figure 2:
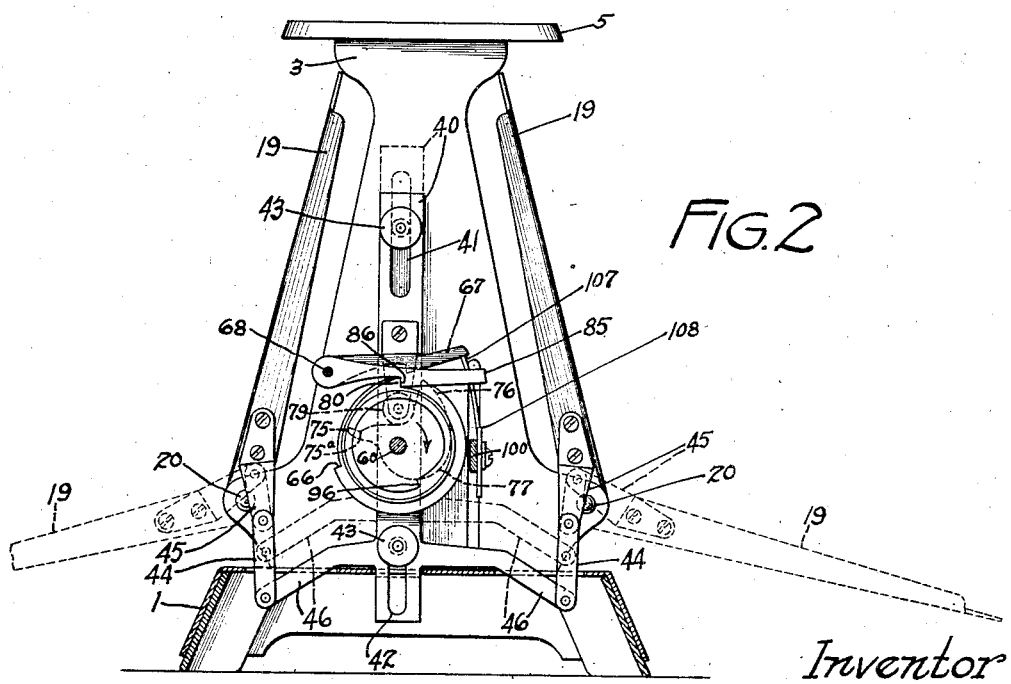
Figure 2 is a view similar to Figure 1 showing the position of the mechanism after the bread has been turned.

Assuming the mechanism now positioned as shown in Figure 1. Element 107 first engages the inner pawl and trips it. This allows the spring barrel to rotate in a clockwise direction as viewed in Figures 1, 2, 3 and 7, and as the result of this rotation the portion 77 of the cam engages the roller and raises the slide and allows the slide to drop again to its lowermost position shown in Figure 2. This movement causes the bread turning element to operate, turn the toast, and then return to toasting position with the untoasted side of the bread facing and adjacent the heating element. The outer detent 85 is now holding the spring barrel against further rotation in clockwise direction, and the projections 75 and 76 of the cam have now assumed the positions shown in Figure 3, the toast supporting elements being in closed position and the slide 40 being at its lowermost position. The timing element 100 continues its upward travel, and the adjustable stop 108 finally engages the outer detent and trips the same. The result here is a limited outward movement of the toast supporting and turning elements only sufficient to remove the toast from the heating zone, and to permit withdrawal of the toast, see Figure 3. The toasting cycle is thus complete. The timing lever has now assumed its uppermost position and the detent 91, (see Figure 9), is positioned to engage the shoulder 90 to wind the spring 62 when the lever 100 is again depressed. The inner detent 67 is resting upon the barrel, and detent 85 is held in raised position, all as shown in Figure 3.

The roller engaging portion of that section of the arm 75 which has been designated as a depression 75ª is in reality a portion of a radius passing through the center of rotation of the drum, while that portion of the arm 75 which lies inwardly is a surface tangent to a circle having its center in the axis of rotation of the drum. The arrangement is such that with the mechanism positioned as shown in Figure 2, movement of the drum will raise the slide 40 as long as the roller is engaging the tangently disposed surface of the arm 75, and when the roller arrives at the level of the radial portion of the arm, no further upward movement of the slide will be had because at this time, the pressure by the radial portion is in a direction substantially perpendicular to the direction of the reciprocation of the slide 40.

I claim as my invention:

1. A bread toasting device comprising a heating element, means movable to hold the bread in toasting position, with reference to the heating element, and to withdraw and turn the bread, a timing mechanism, and power operable detent-controlled connections between the timing mechanism and the bread moving means for causing said means respectively to hold the bread in toasting position, turn the bread, again hold the bread in toasting postion, and finally withdraw the bread from toasting position.

2. A bread toasting device comprising a heating element, means movable to hold the bread in toasting position with reference to the heating element and to withdraw and turn the bread, a timing mechanism, including a winding spring, and connections between the timing mechanism and the bread moving means for causing said means respectively to hold the bread in toasting position, turn the bread, again hold the bread in toasting position an finally withdraw the bread after toasting, said connections comprising a slide, having a link connection with the bread moving means, a spring controlled drum arranged to engage and translate the slide, detents for temporarily preventing drum rotation, and a lever connected to simultaneously wind the springs of the timing mechanism and drum when moved in one direction, and for operating the detents to obtain step-by-step rotation of the drum when moving in opposite direction.

3. A bread toasting device comprising a heating element, means movable to hold the bread in toasting position with reference to the heating element to withdraw and turn the bread, a timing mechanism and connections between the timing mechanism and the bread moving means for causing the member respectively to hold the bread in toasting position, turn the bread, again hold the bread in toasting position and finally withdraw the bread after toasting, said connections including a power-operable, detent-controlled mechanism, and a lever connected to simultaneously store power in the timing and power-operable mechanisms, when moved in one direction and arranged to be moved by the timing mechanism in an opposite direction to obtain operation of the power-operable mechanism.

4. A bread toasting device comprising a heating element, means movable to hold the bread in toasting position with reference to the heating element and to withdraw and turn the bread, a timing mechanism including driving means and driving connections between the timing mechanism and the bread moving means for causing said means, respectively to hold the bread in toasting position, turn the bread, again hold the bread in toasting position and finally withdrawing the bread after toasting, and a swingable element movable to store power in the timer driving means and in the said driving connections, and further movable to control the driving connections, for step-by-step release to obtain bread turning operation of said bread moving means.

5. A device of the class described comprising a member movable to turn toast, said member being opposable to a heating element, a timing mechanism, a power operable drum, connections between the drum and timing mechanism between the drum and the toast turning member, detents engageable with the drum to release the same intermittently for causing the toast turning member to hold the toast in toasting position, for operating the toast turning member to turn the toast, causing a second timing of the toast after turning, and for operating the toast turning member to withdraw the toast after the second toasting operation, and a swingable element being engageable to trip the detents, said element being connected to cause storing of power in the timing mechanism and drum, when moved in one direction and, being adapted to trip the detents when moved in an opposite direction by the timing mechanism.

6. A bread toasting device comprising a heating element, means movable to hold the bread in toasting position with reference to the heating element and adapted when moved in one direction to turn the bread, a timing mechanism including movable means for setting the same, detent control means connecting the timing mechanism with the bread moving means, the arrangement being such that the setting means after a setting movement, is moved by the timing mechanism to successively release the detent-controlled connecting means to obtain a step by step operation for the purpose set forth.

7. A bread toasting apparatus comprising a heating element, means movable to hold the bread in toasting position with reference to the heating element and withdraw and turn the bread, a timing mechanism, detent-controlled connections between the timing mechanism and the bread moving means for causing the member respectively to hold the bread in toasting position, turn the bread, again holding the bread in toasting position and finally withdrawing the bread, said timing mechanism including means for winding the same and said means engageable with the detent controlled connections for obtaining a step by step operation of the detents of said mechanism.

8. A cooking device comprising a heating element, means movable to hold an article of food in cooking position with reference to the heating element, and to withdraw the food, a slide, means operably connecting the slide with the food-holding means, a barrel, a spring adapted to drive the barrel, a cam rotatable with the barrel, and adapted to operate the slide, detent means adapted to secure the barrel against rotation, and timing means adapted to effect release of said detent means.

9. A cooking device comprising a heating element, means movable to hold an article of food in cooking position with reference to the heating element, and to withdraw the food, a slide, means operably connecting the slide with the food-holding means, a barrel adapted to operate the slide, a spring adapted to drive the barrel, detent means adapted to secure the barrel against rotation, and timing means adapted to effect release of said detent means.

10. A cooking device comprising a heating element, means movable to hold an article of food in cooking position with reference to the heating element, and to withdraw and turn the article, a timing mechanism, a power operable mechanism interposed between and connected with the timing mechanism and food moving means for causing said means respectively to hold the food in cooking position, turn the food at the end of one cooking operation, again hold the food in cooking position and finally withdraw the food after cooking, including detents adapted to control said power operable mechanism and a lever adapted to engage the detent for a step-by-step release, and means adapting said lever to be controlled by said timing mechanism.

11. A bread toasting device comprising a heating element, means movable to hold the bread in toasting position with reference to the heating element and to withdraw and turn the bread, a timing mechanism, and power-operable detent-controlled connections between the timing mechanism of the bread moving means for causing said means to hold the bread in toasting position, move the element to turn the bread and again move the element to hold the bread in toasting position and finally move the element to withdraw the bread from toasting position, and means by which manual movement of said bread holding means initiates the controlling action of said power-operable detent-controlled connections.

12. A bread toasting device comprising a heating element, means movable to hold the bread in toasting position with reference to the heating element and to withdraw and turn the bread, a timing mechanism, and power-operable detent-controlled connections between the timing mechanism of the bread moving means for causing said means to hold the bread in toasting position, move the element to turn the bread and again move the element to hold the bread in toasting position and finally move the element to withdraw the bread from toasting position, said power-operable connections including a power spring and a lever and means by which it is adapted to initiate an operation of the timing mechanism, and wind said power spring.

In witness whereof, I have hereunto set my hand this 19th day of May 1927.

THOMAS C. FORBES.